US008695203B2

(12) United States Patent
Jannot et al.

(10) Patent No.: US 8,695,203 B2
(45) Date of Patent: Apr. 15, 2014

(54) PROCESS FOR MANUFACTURING A PLASTIC FUEL TANK AND INTERNAL ACCESSORY

(75) Inventors: Frederic Jannot, Bousval (BE); Bjorn Criel, Sint-Martens-Lennik (BE); Barbara Mabed, Sint-Martens-Lennik (BE); Pierre-Francois Tardy, Brussels (BE); Ralph Pohlmann, Margny-les-Compiegne (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 242 days.

(21) Appl. No.: 13/057,180

(22) PCT Filed: Aug. 4, 2009

(86) PCT No.: PCT/EP2009/060066
§ 371 (c)(1),
(2), (4) Date: Feb. 2, 2011

(87) PCT Pub. No.: WO2010/015615
PCT Pub. Date: Feb. 11, 2010

(65) Prior Publication Data
US 2011/0139342 A1 Jun. 16, 2011

(30) Foreign Application Priority Data
Aug. 7, 2008 (FR) ...................................... 08 55457

(51) Int. Cl.
*B23P 17/00* (2006.01)
*B29C 43/02* (2006.01)
*B29C 49/00* (2006.01)
*B29D 22/00* (2006.01)

(52) U.S. Cl.
USPC .......... 29/527.1; 264/516; 264/523; 264/540; 264/553

(58) Field of Classification Search
USPC ......... 29/527.1, 469; 264/516, 523, 540, 553, 264/554
See application file for complete search history.

(56) References Cited

U.S. PATENT DOCUMENTS 3,575,949 A * 4/1971 Humphrey .................... 264/516
4,396,562 A * 8/1983 Heaume ........................ 264/445

(Continued)

FOREIGN PATENT DOCUMENTS

AL 1099529 A1 5/2001
CA 2641463 A1 8/2007

(Continued)

OTHER PUBLICATIONS

U.S. Appl. No. 13/057,185, filed Feb. 2, 2011, Frederic Jannot, et al.

(Continued)

*Primary Examiner* — Essama Omgba
(74) *Attorney, Agent, or Firm* — Oblon, Spivak, McClelland, Maier & Neustadt, L.L.P.

(57) ABSTRACT

Process for manufacturing a plastic fuel tank (FT) equipped with an internal accessory, by molding a parison using a mold comprising two cavities and a core, said process comprising the following steps: the parison is introduced into the mold cavities; the core is introduced inside the parison, the core having first been fitted with the accessory; the mold is closed so that the cavities come into leaktight contact with the core; the parison is pressed against the cavities by blowing through the core and/or applying a vacuum behind the cavities; the accessory is fastened to the parison by snap riveting using a device attached to the core; the mold is opened to withdraw the core; and the final molding of the parison is carried out by blow molding and/or thermoforming. The accessory comprises an orifice for the snap riveting and at least one protuberance which, during the fastening of the accessory by snap riveting, will at least partially melt to form a local weld which is at another location than the obtained rivet to obtain two different attachment points.

10 Claims, 4 Drawing Sheets

(56) References Cited

U.S. PATENT DOCUMENTS

| | | | |
|---|---|---|---|
| 4,719,072 A * | 1/1988 | Kojima et al. | 264/515 |
| 4,952,347 A * | 8/1990 | Kasugai | 264/457 |
| 5,104,472 A * | 4/1992 | Kasugai et al. | 156/245 |
| 5,308,427 A * | 5/1994 | Duhaime et al. | 156/245 |
| 5,326,514 A * | 7/1994 | Linden et al. | 264/83 |
| 5,445,783 A * | 8/1995 | Irish et al. | 264/515 |
| 5,514,323 A * | 5/1996 | Ramioulle | 264/516 |
| 5,891,385 A * | 4/1999 | Cerbelle et al. | 264/515 |
| 6,527,892 B1 | 3/2003 | Gombert et al. | |
| 6,712,234 B2 * | 3/2004 | Boecker | 220/563 |
| 6,726,967 B2 * | 4/2004 | Vorenkamp et al. | 428/34.1 |
| 6,844,037 B2 * | 1/2005 | Gombert et al. | 428/35.7 |
| 7,131,452 B2 | 11/2006 | Potter et al. | |
| 7,290,675 B2 * | 11/2007 | Gombert et al. | 220/562 |
| 7,780,901 B2 * | 8/2010 | Masse et al. | 264/531 |
| 8,105,528 B2 * | 1/2012 | Aoki et al. | 264/515 |
| 8,122,604 B2 * | 2/2012 | Jannot et al. | 29/897.2 |
| 8,163,228 B2 * | 4/2012 | Criel et al. | 264/516 |
| 8,282,875 B2 * | 10/2012 | Roos et al. | 264/516 |
| 8,287,799 B2 * | 10/2012 | Borchert et al. | 264/545 |
| 8,470,235 B2 * | 6/2013 | Criel et al. | 264/545 |
| 8,580,064 B2 * | 11/2013 | Jannot et al. | 156/245 |
| 2001/0013516 A1 * | 8/2001 | Boecker | 220/562 |
| 2001/0015513 A1 | 8/2001 | Van Schaftingen et al. | |
| 2002/0020487 A1 | 2/2002 | Vorenkamp et al. | |
| 2002/0043533 A1 * | 4/2002 | Gombert et al. | 220/4.13 |
| 2005/0145316 A1 | 7/2005 | Benjey et al. | |
| 2005/0194711 A1 * | 9/2005 | Choji et al. | 264/132 |
| 2005/0199634 A1 * | 9/2005 | Choji et al. | 220/562 |
| 2005/0205156 A1 | 9/2005 | Ganachaud et al. | |
| 2007/0254172 A1 | 11/2007 | Kanazawa et al. | |
| 2008/0006625 A1 * | 1/2008 | Borchert et al. | 220/4.13 |
| 2008/0149642 A1 | 6/2008 | Borchert et al. | |
| 2009/0019683 A1 * | 1/2009 | Jannot et al. | 29/428 |
| 2010/0126659 A1 * | 5/2010 | Roos et al. | 156/245 |
| 2010/0212806 A1 | 8/2010 | Lemoine et al. | |
| 2011/0131771 A1 * | 6/2011 | Jannot et al. | 24/571 |
| 2011/0131788 A1 * | 6/2011 | Jannot et al. | 29/525.06 |
| 2011/0131789 A1 * | 6/2011 | Pohlmann et al. | 29/525.06 |
| 2012/0326357 A1 * | 12/2012 | Roos et al. | 264/529 |

FOREIGN PATENT DOCUMENTS

| | | | |
|---|---|---|---|
| DE | 10010900 A1 | 9/2001 | |
| DE | 102006006469 A1 | 8/2007 | |
| EP | 1110697 A2 | 6/2001 | |
| FR | 2918595 A1 | 1/2009 | |
| GB | 1410215 A | 10/1975 | |
| JP | 1056526 A | 3/1989 | |
| JP | 8192457 A | 7/1996 | |
| WO | WO 2004024487 A1 | 3/2004 | |
| WO | WO 2006008308 A1 | 1/2006 | |
| WO | WO 2007000454 A1 | 1/2007 | |
| WO | WO 2007093573 A1 | 8/2007 | |
| WO | WO 2010015615 A1 * | 2/2010 | B29C 49/20 |
| WO | WO 2010015670 A1 | 2/2010 | |
| WO | WO 2010015673 A1 | 2/2010 | |
| WO | WO 2010023212 A2 | 3/2010 | |

OTHER PUBLICATIONS

U.S. Appl. No. 13/057,203, filed Feb. 2, 2011, Frederic Jannot, et al.
U.S. Appl. No. 13/059,146, filed Feb. 15, 2011, Ralph Pohlman, et al.

* cited by examiner

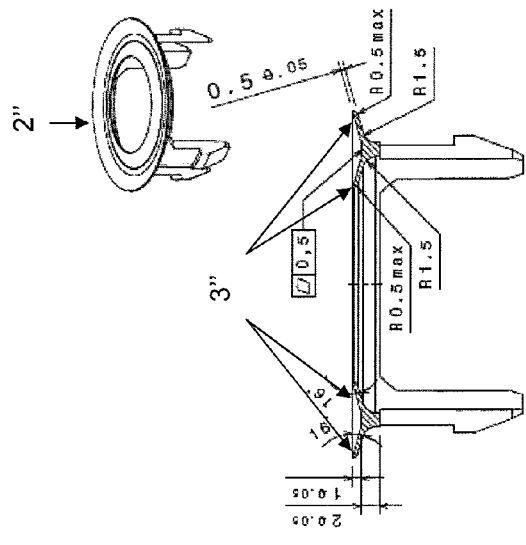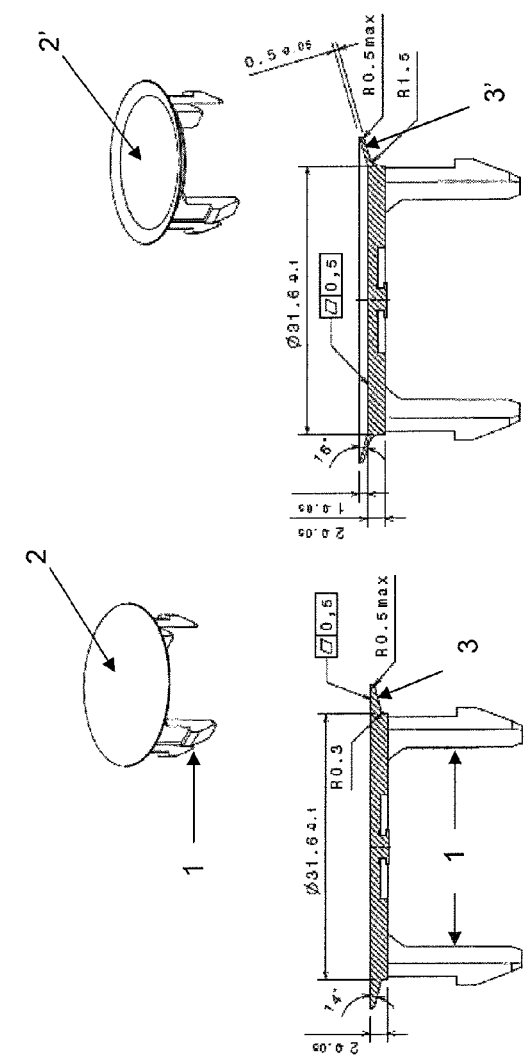
*Fig. 1*
*Fig. 2*
*Fig. 3*

PROCESS FOR MANUFACTURING A PLASTIC FUEL TANK AND INTERNAL ACCESSORY

CROSS-REFERENCE TO RELATED APPLICATIONS

This application is a U.S. national stage application under 35 U.S.C. §371 of International Application No. PCT/EP2009/060066 filed Aug. 4, 2009, which claims priority to French Application No. FR 08.55457 filed Aug. 7, 2008, this application being herein incorporated by reference in its entirety for all purposes.

TECHNICAL FIELD OF THE INVENTION

The present invention relates to a process for manufacturing a plastic fuel tank (FT).

BACKGROUND OF THE INVENTION

Fuel tanks on board vehicles of various kinds generally have to meet sealing and permeability standards in relation to the type of use for which they are designed and the environmental requirements that they have to satisfy. At the present time, both in Europe and throughout the world, there is a substantial tightening of the requirements regarding the limitation of pollutant emissions into the atmosphere and into the environment in general.

To limit these emissions, care is taken in particular to position the accessories (ventilation lines, valves, baffles, stiffeners, etc.) inside the tank and/or the fill pipe (see in particular Application WO 2004/024487 in the name of the Applicant). However, when these components are fastened to the tank after it has been molded, it is generally necessary to make at least one opening in the tank so as to be able to introduce said components into the tank and to fasten them thereto. Hence there may be potential sealing problems near this opening.

Several years ago the Applicant therefore developed a process of initially molding a cut parison (cut into two sections) in order to be able to introduce thereinto and fasten thereto accessories during the actual molding of the tank and to thus avoid drilling openings (see Patent EP 1 110 697 in the name of the Applicant).

The Applicant has also developed a particular method for this fastening (in situ snap-riveting, the subject of Applications WO 2006/008308, FR 0756411 and PCT/EP2007/051326, the content of which is also incorporated by reference into the present application).

This technique, which is common in the field of metallurgy and that consists in molding a rivet in situ, from molten material that has been allowed to flow in and/or through an orifice of the part to be fastened and then that is left therein to solidify so as to form in situ a snap rivet or sort of rivet/bolt, has, however, several drawbacks.

The Applicant has specifically observed that in order for the material to be able to effectively flow into the snap-riveting orifice and optionally to overflow therefrom, it is necessary that this orifice has a diameter greater than 1 cm, even at least equal to 2 cm. A single fastening point is not generally sufficient to obtain a reliable fastening (to obtain therefrom one having a perfect isostatism, it is ideally necessary to provide 3 fastening points that unequivocally define a fastening plane for the part, thus avoiding an unsatisfactory fastening). Hence, this technique is not suitable for parts of small dimensions.

Moreover, in the case where the parts to be fastened are heavy, if it turns out in practice that the number of snap-riveting orifices is not sufficient to be able to support the weight of the part without damaging the parison or the wall of the tank, it will be necessary to profoundly modify the mold of the injection-molded part, the mold of the fuel tank and the snap-riveting tool in order to insert therein one or two supplementary snap rivets.

SUMMARY

The Applicant has hence had the idea of providing said part with protuberances of small dimensions so that, when it is fastened by snap riveting to the parison that will be molded in the shape of a fuel tank, these protuberances will at least partially melt to form a local weld (i.e., a molecular entanglement of their molecules with those of the inner surface of the wall of the tank).

For this purpose, the invention relates to a process for manufacturing a plastic fuel tank equipped with an internal accessory, by molding a parison using a mold comprising two cavities and a core, said process comprising the following steps:

1. the parison is introduced into the mold cavities;
2. the core is introduced inside the parison, said core having first been fitted with the accessory;
3. the mold is closed so that the cavities come into leaktight contact with the core;
4. the parison is pressed against the cavities by blowing through the core and/or applying a vacuum behind the cavities;
5. the accessory is fastened to the parison by snap riveting using a device attached to the core;
6. the mold is opened to withdraw the core; and
7. the final molding of the parison is carried out by blow molding (by injecting a pressurized fluid inside the parison) and/or thermoforming (by applying a vacuum behind the cavities), wherein the accessory comprises an orifice for the snap riveting and at least one protuberance, for which the constituent material, the dimensions, and the position are such that during the fastening of the accessory by snap riveting, this protuberance will at least partially melt to form a local weld which is at another location than the obtained rivet (so that two different attachment points are obtained).

BRIEF DESCRIPTION OF THE DRAWINGS

For a detailed description of the invention, reference will now be made to the accompanying drawings in which:

FIG. 1 illustrates a geometry for a welding clip comprising fastening tabs to be inserted into an orifice of the accessory to be fastened and a cover that has the shape of a plate (2) with a tapered edge (3);

FIG. 2 illustrates a variant geometry for a welding clip comprising fastening tabs and a cover that has the shape of a plate (2') with a curved tapered edge (3');

FIG. 3 illustrates another variant geometry for a welding clip comprising fastening tabs and a cover that has the shape of a crown (2") with a double curved edge (3");

DETAILED DESCRIPTION OF PREFERRED EMBODIMENTS

Figure 4:
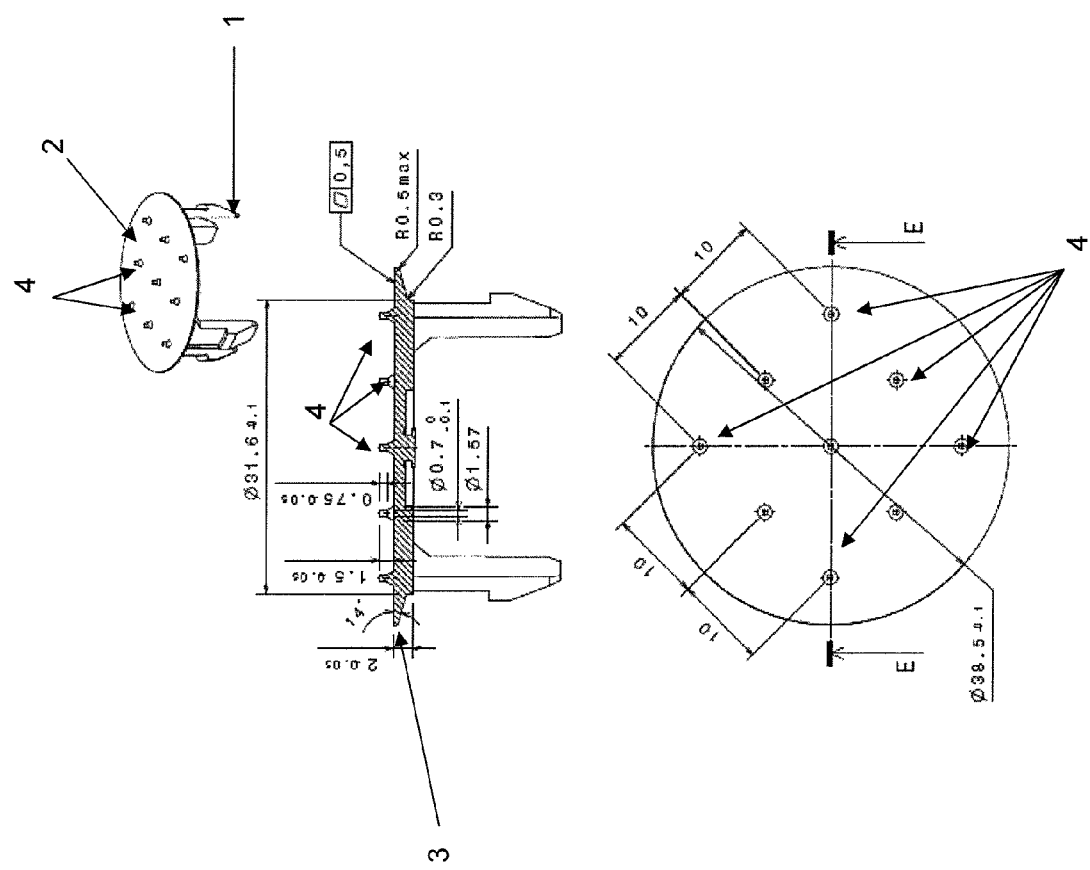
FIG. 4 illustrates yet another variant geometry for a welding clip comprising fastening tabs and a cover that has the shape of a plate (2) with a tapered edge (3), the clip also comprising spots (4) that are evenly distributed over the plate (2) and that will create additional local welds reinforcing the bond strength of the clip.

The expression "fuel tank" is understood to mean an impermeable tank, able to store fuel under diverse and varied usage and environmental conditions. An example of this tank is that with which motor vehicles are fitted.

The fuel tank according to the invention is made of plastic.

The term "plastic" means any material comprising at least one synthetic resin polymer.

Any type of plastic may be suitable. Particularly suitable plastics belong to the category of thermoplastics.

The term "thermoplastic" is understood to mean any thermoplastic polymer, including thermoplastic elastomers, and also blends thereof. The term "polymer" is understood to mean both homopolymers and copolymers (especially binary or ternary copolymers). Examples of such copolymers are, in a non-limiting manner: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, it is possible to use polyolefins, thermoplastic polyesters, polyketones, polyamides and copolymers thereof. A blend of polymers or copolymers may also be used; similarly it is also possible to use a blend of polymeric materials with inorganic, organic and/or natural fillers such as, for example but in a non-limiting manner: carbon, salts and other inorganic derivatives, natural or polymeric fibres. It is also possible to use multilayer structures composed of stacked and joined layers comprising at least one of the polymers or copolymers described above.

One polymer that is often used is polyethylene. Excellent results have been obtained with high-density polyethylene (HDPE).

The wall of the tank may be composed of a single thermoplastic layer, or of two layers. One or more other possible additional layers may, advantageously, be composed of layers made of a barrier material to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulphonation) for the purpose of making it impermeable to the fuel.

The tank according to the invention preferably comprises an EVOH-based barrier layer located between the HDPE-based outer layers.

According to the invention, the tank is produced by molding a parison. The term "parison" is understood to mean a generally extruded preform of molten plastic that is intended to form the wall of the tank after molding to the required shapes and dimensions. This preform does not necessarily have to be a one-piece preform.

Thus, advantageously, the parison is in fact made up of two separate pieces, which may be two sheets, for example. However, these pieces preferably result from cutting one and the same extruded tubular parison as described in the aforementioned Application EP 1 110 697, the content of which is, for this purpose, incorporated by reference in the present application. According to this variant, once a single parison has been extruded, this parison is cut over its entire length, along two diametrically opposed lines, to obtain two separate portions (sheets).

Compared with the molding of two separately extruded sheets, of constant thickness, this approach allows the use of parisons having a variable thickness (that is to say a thickness that is not constant over their length), which are obtained by a suitable extrusion device (generally an extruder provided with a die having a positionally-adjustable mandrel). Such a parison takes account of the thickness reduction that occurs during molding at certain points on the parison, as a result of non-constant levels of deformation of the material in the mold.

After a parison has been molded in two pieces, these pieces generally form the lower and upper walls respectively of the fuel tank, each having an inner surface (pointing towards the inside of the tank) and an outer surface (pointing towards the outside of the tank).

The mold used in the process according to the invention comprises a core, i.e. a part of suitable size and shape for being able to be inserted between the cavities of the mold when the parison is located therein and to fasten thereto the components inside the tank without the edges of the parison being welded (since the core must be removed before the final molding of the tank, a step during which the welding of the parison sections is carried out). Such a part (core) is, for example, described in Patent GB 1 410 215, the content of which is for this purpose incorporated by reference into the present application.

This mold also comprises two cavities that are intended to be in contact with the outer surface of the parison, the parison being molded by blow molding (pressing the parison against these cavities using a pressurized gas injected inside the parison) and/or by thermoforming (drawing a vacuum behind the mold cavities).

Preferably, it takes place by blow molding, but preferably while also providing suction (drawing a vacuum) behind the cavities to keep the parison in the mold when the latter is not closed and pressurized. Hence, it preferably comprises a degassing step prior to step (6). Generally, in order to do this the parison is first pierced (for example by puncturing it with a needle) and then the fluid is discharged from the mold (for example using a valve).

In the process according to the invention, the accessory is fastened to the inner surface of the parison by virtue of a device attached to the core that generally comprises a jack. Preferably, the core allows several accessories to be fastened to the inside of the tank, these accessories preferably being preassembled on the core, before it is inserted into the mold, at their corresponding location on the parison (see the aforementioned Application WO 2007/000454).

According to the invention, the accessory is fastened both by snap riveting at least one point and by a local weld at least one other point. For this purpose it is equipped with at least one orifice (generally of substantially circular or oblong cross section) for the snap riveting and with at least one protuberance for the local weld. This protuberance must be situated at a location and have dimensions such that during the snap riveting it at least partially melts in contact with the molten plastic that constitutes the parison and optionally penetrates therein, whilst the portion of the accessory surrounding said protuberance does (almost) not melt (if it is optionally not at the surface depending on its constituent material). This portion therefore acts as a stop surface making it possible to limit the overall penetration of the accessory into the molten parison (and by doing so, to prevent the barrier layer of the FT from being damaged, where appropriate).

In the case where the FT has a multilayer structure that includes a barrier layer, the dimensions and the shape of the protuberance are preferably such that the latter does not pierce the barrier layer. In particular, it is preferable that the protuberance does not protrude (does not stick out) by more than 2 mm, or even 1.5 mm relative to the surface of the accessory.

According to one variant that is particularly preferred (since it reduces the distortions that may occur following the local compression of the material during snap riveting and/or following the shrinkage of the parison after it has cooled), the snap riveting takes place to the right of a relief (a sort of dome) in the wall of the tank, which is concave when seen from the outside of the tank and convex when seen from the inside. In practice, this relief may be produced with the aid of a boss in the cavities of the mold. Its dimensions are dependent on the geometry of the tank and of the accessory, in particular in the area of the snap-riveting orifice. Generally, it has a diameter of a few centimeters, for example of from 2 to 5 cm, and a height ranging from 1 to 15 mm, preferably from 2 to 8 mm.

In this variant, the snap-riveting zone of the accessory is preferably set back relative to the welding zone so that, when the accessory is brought into contact with the parison in order to be fastened thereto, the snap riveting in the zone in relief (dome) and the welding take place simultaneously.

The accessory according to the invention may be made of any material suitable for its function, on condition that the aforementioned protuberance is made of a material identical to or compatible with that of the inner surface of the tank in order to be able to achieve the local weld. Most particularly preferably, it is a similar polymer (of the same nature, for example HDPE), but that preferably has a higher melt flow index (MFI) than that of the tank so as to melt thereon more easily. According to one advantageous variant of the invention, the accessory comprises at least one portion based on a material that has a thermal resistance greater than that of the tank (for example: based on PA (polyamide) or on POM (polyoxymethylene) when the tank is made of HDPE).

When the accessory is based on a material identical to or compatible with that of the tank, the protuberance may be molded from one part with it. However, according to one preferred variant, the protuberance belongs to a part attached to the accessory. One way of achieving this consists in making an orifice in the part (either during the molding of this part, or via subsequent machining, which is generally more practical) inserted through which is a part that for ease will subsequently be described as a "clip". This variant has the advantage that the accessory may be made of any material; it is enough for the clip to be made from a material compatible with that of the FT.

In this variant, the clip may have any shape. Generally, it comprises a cover (dome) that constitutes or includes the protuberance itself and that generally has a substantially circular cross section. It may be a plate that has a flat surface and a tapered, optionally curved, edge, or a thin crown (or ring) that preferably has its two edges curved to double the bond strength of the weld.

An embodiment that gives good results when the clip is shaped like a "solid" plate (and not like a ring) consists in providing the edge of the clip with a kind of tongue in order to enable what is called the "flower test" and hence, enable the testing of the quality of the weld. This test is a destructive test consisting in cutting two welded components in equal parts (for instance, 8 or 16 parts) and in trying to separate the welded components by tearing them apart (manually or with a tension machine). If the parts break in one of the components, then the weld is of good quality. On the contrary, if they break inside the weld, then it is a bad or so called "cold" weld.

The accessory fastened by the process according to the invention may comprise sorts of welding spots preferably that are uniformly distributed over the welding clips and/or over the part itself (when it is made of a material compatible with that of the FT).

In the case where the size and the weight of the accessory allow it, in order to obtain a robust and isostatic fastening, use will preferably be made of at least three fixation points and more preferably, of a snap rivet and two welded clips to fasten it. More fastening points may be required depending on the size and/or the weight of the accessory. Generally, the latter (i.e., their number, nature (snap rivet or weld) and location) are determined experimentally. They are generally spread homogeneously at the surface of the accessory which will be in contact with the inner tank wall.

The present invention also relates to an FT equipped with an accessory fastened to its inner wall using at least one snap rivet and at least one weld that is delocalized with respect to said snap rivet. By "delocalized" is meant located somewhere else on the accessory, in an area remote enough to be considered as a different fixation point.

This accessory may be any accessory. It may be, for example, a valve, a pump/gauge module, a liquid/vapour separation vessel, etc. The invention gives good results with pump/gauge modules or the support thereof.

The invention is illustrated in a non-limiting manner by the appended FIGS. 1 to 6. In these figures, the dimensions are given by way of example and identical numbers denote identical or similar components.

Appended FIGS. 1 to 4 illustrate preferred geometries for the welding clips mentioned above, and FIGS. 5 and 6 illustrate two different views of one and the same accessory intended for the process according to one variant of the invention.

The clips illustrated in FIGS. 1 to 4 all comprise fastening tabs (1) that are intended to be inserted into an orifice of the accessory to be fastened (not represented) and a cover that has the shape:

of a plate (2) with a tapered edge (3) in the variant from FIGS. 1 and 4;

of a plate (2') with a curved tapered edge (3') in the variant from FIG. 2;

of a crown (2") with a double curved edge (3") in the variant from FIG. 3, which is preferred as it doubles the bond strength of the weld (due to the double weld obtained).

In the variant illustrated in FIG. 4, the clip also comprises spots (4) that are evenly distributed over the plate (2) and that will create additional local welds reinforcing the bond strength of the clip. This variant is therefore also preferred.

Figure 5:
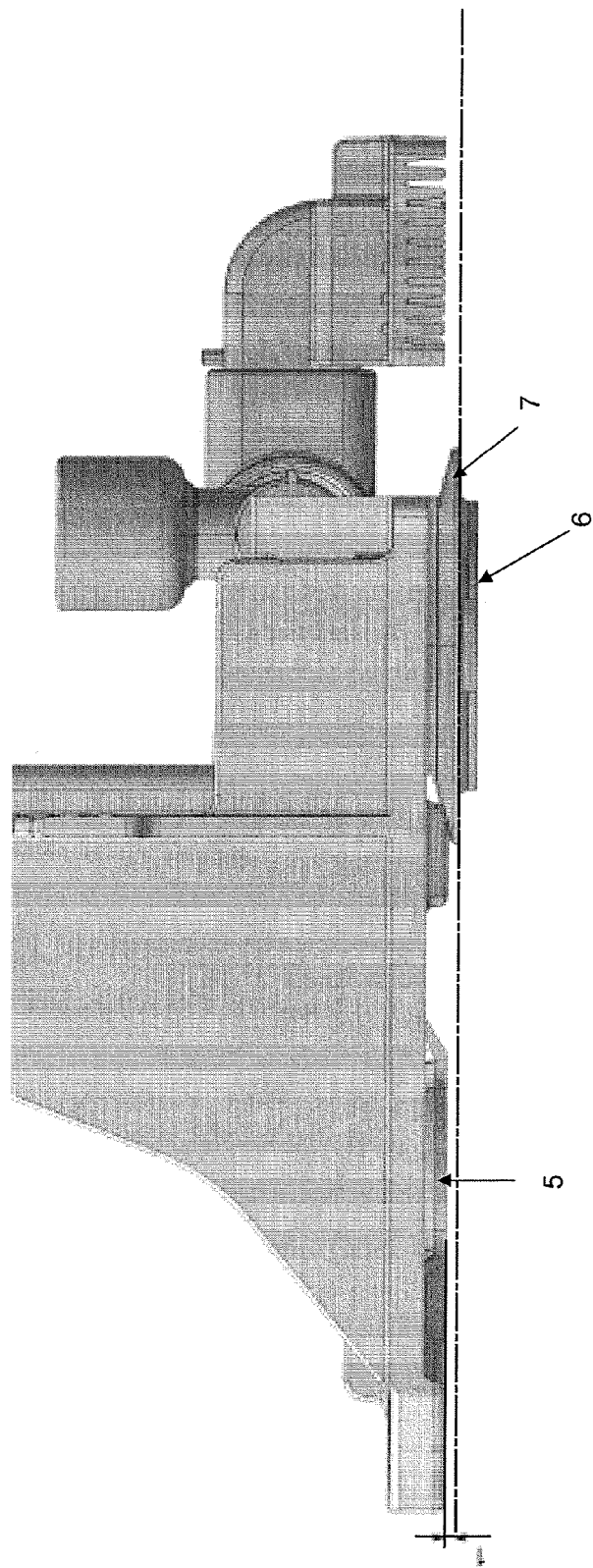
FIG. 5 illustrates a first view of an accessory intended for the process according to one variant of the invention, the accessory being a gauge support.
Figure 6:
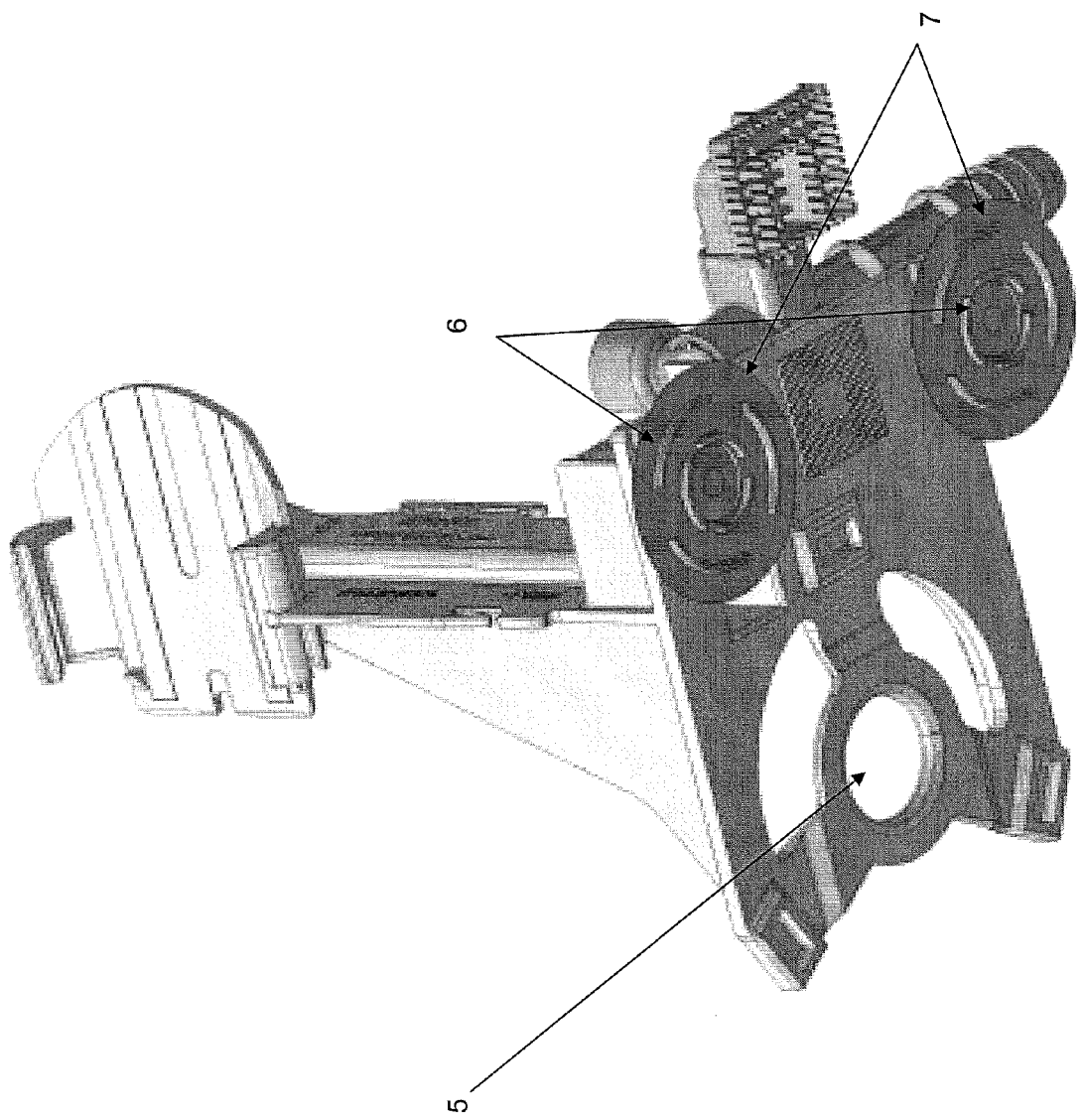
FIG. 6 illustrates a different view of the same accessory as shown in FIG. 5.

The accessory illustrated in FIGS. 5 and 6 is a gauge support that comprises a snap-riveting orifice (5) and reliefs or welding platforms (6) positioned on a stop surface (7), the purpose of which is to limit the penetration of the accessory into the molten plastic. As can be seen in this figure, the snap-riveting zone surrounding the orifice (5) is set back by 1 mm relative to the stop surface (7) so that the snap riveting can be carried out at the same time as the welding, despite the fact that it takes place over a zone in relief (dome) of the parison.

To the right of this zone, the cavities of the mold (not represented) have a boss, i.e. a zone in relief of complementary shape.

The invention claimed is:

1. A process for manufacturing a plastic fuel tank (FT) equipped with an internal accessory, by molding a parison using a mold comprising two cavities and a core, said process comprising:

introducing the parison into the mold cavities;

introducing the core inside the parison, said core having first been fitted with the accessory;

closing the mold so that the cavities come into leaktight contact with the core;

pressing the parison against the cavities by at least one of blowing through the core and applying a vacuum behind the cavities;

fastening the accessory to the parison by snap riveting using a device attached to the core;

opening the mold to withdraw the core; and carrying out the final molding of the parison by at least one of blow molding and thermoforming, wherein the accessory comprises an orifice for the snap riveting and at least one protuberance, for which its constituent material, its dimensions and its position are such that during the fastening of the accessory by snap riveting, said protuberance at least partially melts to form a local weld which is at another location than the obtained rivet so that two different attachment points are obtained.

2. The process according to claim 1, wherein the parison is made up of two separate pieces originating from one and the same extruded tubular parison that is cut over its entire length, along two diametrically opposed lines.

3. The process according to claim 1, wherein the fuel tank has a multilayer structure that includes a barrier layer and in that the dimensions and the shape of the protuberance are such that the latter does not pierce the barrier layer.

4. The process according to claim 1, wherein the protuberance is based on a polymer of the same nature as that constituting the inner surface of the fuel tank, but that has a higher melt flow index (MFI) than the latter.

5. The process according to claim 1, wherein the protuberance belongs to a part attached to the accessory.

6. The process according to claim 5, wherein the part attached is a clip inserted into an orifice of the accessory.

7. The process according to claim 6, wherein the clip comprises a cover that constitutes or includes the protuberance and that has the shape of a plate that has a flat surface and a tapered, or curved edge, or of a thin crown or ring that has its two edges curved.

8. The process according to claim 1, wherein the accessory is equipped with welding spots that are uniformly distributed over at least one of welding clips and the accessory itself.

9. The process according to claim 1, wherein the accessory is fastened via 3-three fastening points consisting of a snap rivet and two welded clips.

10. The process according to claim 1, wherein the snap riveting takes place to the right of a relief in the wall of the tank, which is concave when seen from the outside of the tank and convex when seen from the inside.

* * * * *